Figure 1:
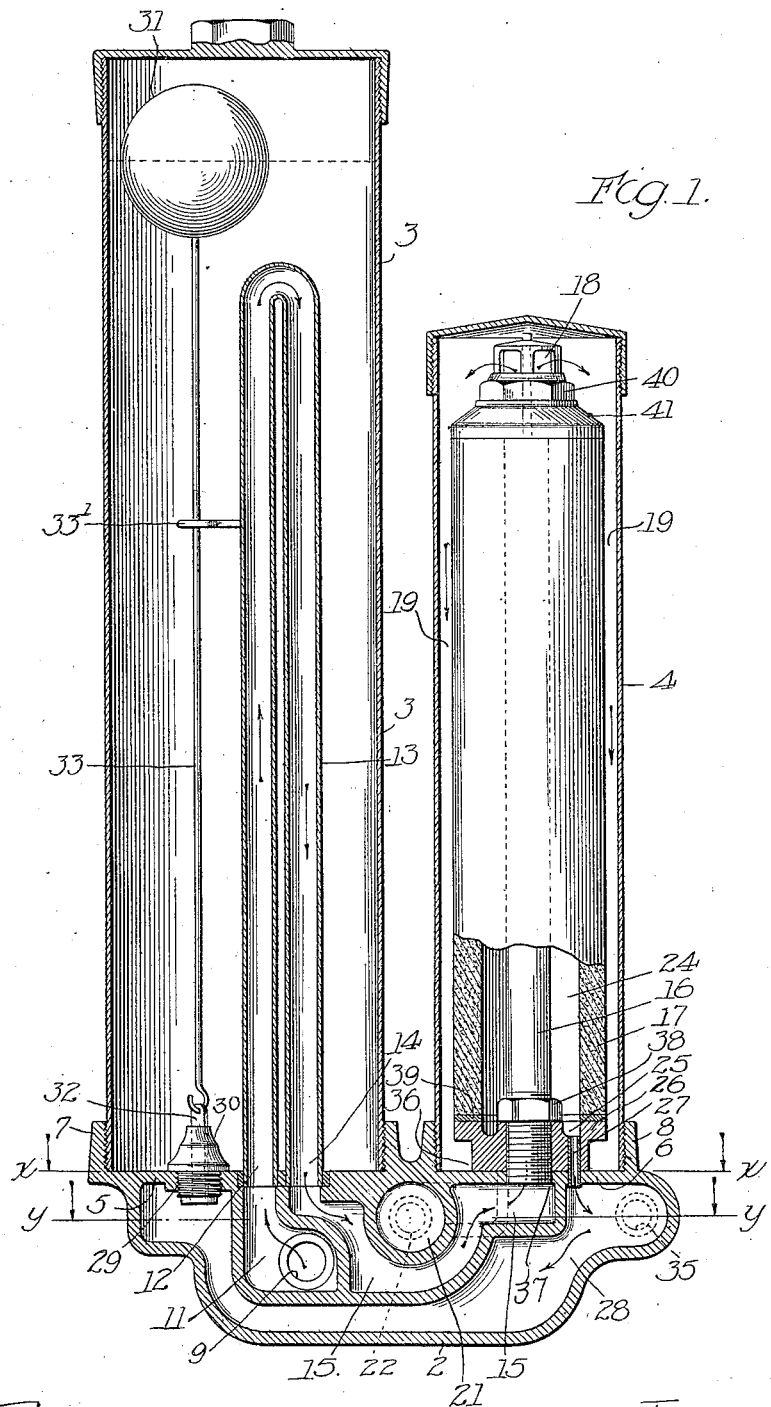

W. R. HILDEBRAND.
WATER FILTER.
APPLICATION FILED MAY 17, 1909.

1,043,933.

Patented Nov. 12, 1912.

2 SHEETS—SHEET 1.

Witnesses:
Robert H. Weir
Edwin B. Kleon

Inventor:
William R. Hildebrand
By J. Warner Beckstrom
Atty

W. R. HILDEBRAND.
WATER FILTER.
APPLICATION FILED MAY 17, 1909.
1,043,933.
Patented Nov. 12, 1912.
2 SHEETS—SHEET 2.
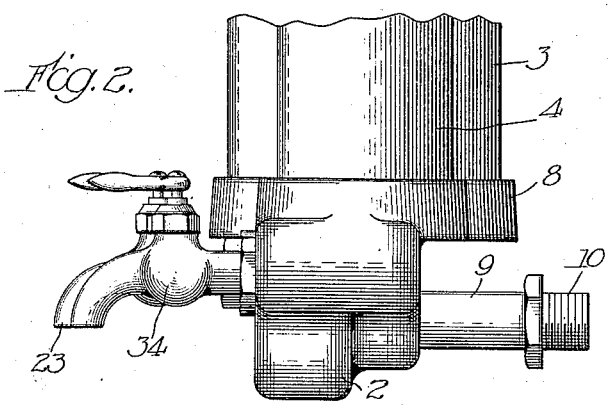
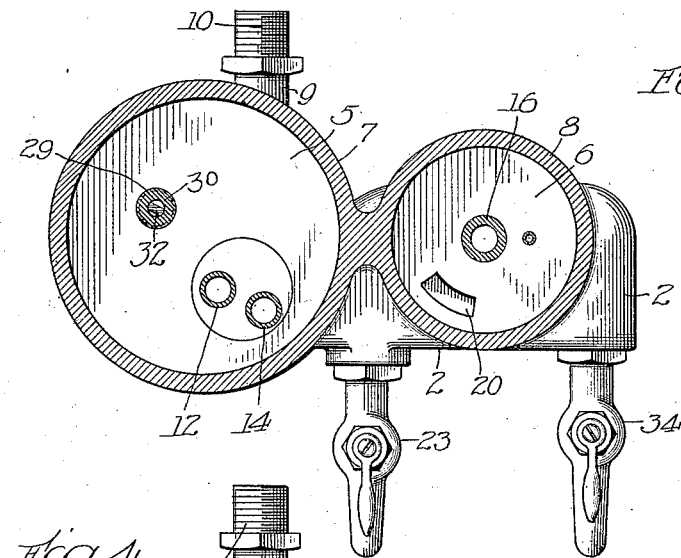
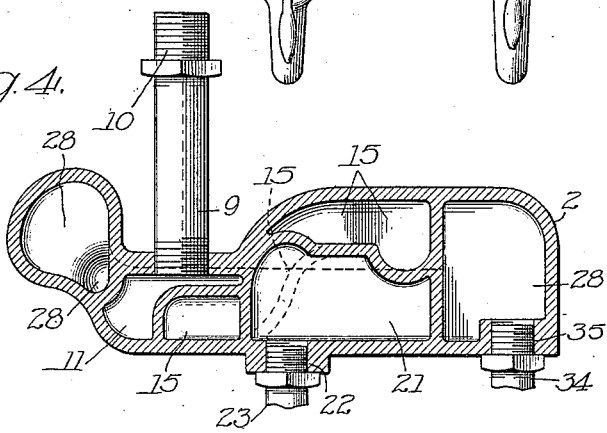
Witnesses:
Robert N. Weir
Edward Nelson
Inventor:
William R. Hildebrand
By J. Warner Backstrom
Atty.

UNITED STATES PATENT OFFICE.

WILLIAM R. HILDEBRAND, OF CHICAGO, ILLINOIS.

WATER-FILTER.

1,043,933.  Specification of Letters Patent.  Patented Nov. 12, 1912.

Application filed May 17, 1909.   Serial No. 496,562.

*To all whom it may concern:*

Be it known that I, WILLIAM R. HILDEBRAND, a citizen of the United States, residing at Chicago, in the county of Cook and State of Illinois, have invented certain new and useful Improvements in Water-Filters, of which the following is a specification.

My invention relates to filtering devices and has particular reference to filters designed to be attached to the ordinary faucet connections.

The object of my invention is to provide improvements for the filtering device described in my Patent No. 602,883, of April 26, 1898, whereby the collected supply of filtered water may be cooled in its reservoir, or its coolness maintained after it has left the filtering chamber by the source of its supply, or by the unfiltered water, fresh from the mains, drawn for general domestic purposes. I accomplish this object by circulating the general, unfiltered water supply through every chamber of the filtering device, and the invention consists in the novel construction of filter and its combination of parts, hereinafter described in detail, illustrated in the drawings and incorporated in the appended claims.

In the drawing—Figure 1 is a side elevation in section and partly broken away of a filter embodying my invention. Fig. 2 is a view of the lower part of the filter broken away, taken in a vertical plane at right angles to the vertical plane of Fig. 1. Fig. 3 is a section taken substantially on the line X—X of Fig. 1. Fig. 4 is a section taken substantially on line Y—Y of Fig. 1.

In the several views 2 represents the base of the filter, and same consists of a cast fitting having cored-out passages which communicate with a filtered water reservoir or cylinder 3 and a filtering chamber or cylinder 4. The top of this base is shown as in the form of two circular disks 5 and 6 having peripheral flanges 7 and 8 with which the reservoir 3 and filtering cylinder or chamber 4 have, respectively, threaded engagement. These disks or webs 5 and 6 constitute bottoms for the filtering and reservoir cylinders 3 and 4.

From the rear of the base or fitting 2 extends a running water supply pipe or water main 9 which connects with the base of the filter. Said base has a threaded end 10 which corresponds in function to the threads upon an ordinary faucet and take their place on the supply pipe connection. The pipe 9 communicates with a passage 11 in the base 2 which passage communicates with the inlet-end 12 of a U-shaped pipe 13 that extends from the bottom of the filtered water cylinder or reservoir 3 to a point near its top and returns to the bottom of same, where its outlet-end 14 communicates with a passage 15 that leads into the lower end of a pipe conduit 16 passing vertically through the center of a cylindrical filtering medium 17 consisting of porous porcelain. At 18 the pipe 16 communicates with an annular space 19 between the filtering medium and its cylindrical casing 4 and the space 19 communicates with an opening 20 in the bottom 6 of the filtering chamber. The opening 20 leads into a passage 21 in the base and the latter communicates with a faucet-opening 22 with which a faucet 23 for the general water-supply is connected. When the faucet 23 is closed the pressure of the water in the space 19 causes a percolation of water through the cylindrical and tubular filtering medium 17 and into an annular receiving-chamber 24 between the pipe 16 and said medium, and at the bottom of the space 24 the filtered water is drained into an annular trough 25 in a foot-block 26 upon which the porcelain filtering medium rests.

A small pipe 27 serves as an outlet from the trough 25 and the outlet of said pipe is a passage 28 in the base 2 which passes underneath the other passages described and up to the bottom 5 of the reservoir 3, where said passage communicates with an opening 29 into which is threaded a plug 30 having an opening therethrough controlled by a valve 32 automatically operated by a float 31 having a stem 33 supported laterally by a guide 33' which extends from the U-shaped pipe 13. The lower edge of the foot-piece 26 is cut away or rabbeted to form a circumferential channel which permits the water from the space 19 to enter the segmental opening 20 shown in Fig. 3. The foot-piece 26 has an opening therethrough for the pipe 16 and the lower end of the latter has threaded connection with the bottom 6 at 37. A nut 38 on the pipe, above the foot-piece 26, serves as a lock-nut for said pipe and to clamp the foot-piece 26 tightly against the bottom 6. The porcelain tube 17 has its lower end closed against passage of water between the spaces 19 and 24 by a gasket or annular packing 39 and is pressed down upon this packing by a nut 40 which is screwed down on a cap 41 on the upper end of the porcelain cylinder 17. This cap is made water tight between the spaces 19 and 24 in any suitable manner the details of which are not involved in this invention.

When the filter above described is attached to the supply pipe, water entering the pipe 9 passes first into the space or passage 11 through the reservoir 3 by way of the U-shaped pipe 13, thus cooling the contents of said reservoir. Thence the unfiltered water passes through the passage 15 into the pipe 16 and from the latter down around the filtering medium 17, scouring its outer surface and carrying off the filtering deposits through the faucet 23 by way of the passages 20 and 21, instead of stopping around said filtering medium in a stagnant, clogging, stale and lifeless body as in the common form of filters. During the short intervals that the faucet 23 is closed the water filters from the space 19 through the filtering medium into the space 24, thence to the space 28 and the reservoir 3, which spaces and reservoir are drained through a filtered water outlet 35 which is valve-controlled or provided with a pet cock or faucet 34 which supplies the drinking water while the larger consumption of water is drained through the faucet 23 and caused to clean and cool the whole filter.

I claim as my invention—

1. In a filter, the combination with a water main and an outlet faucet therefor, of a base, a filtering chamber, a receiving chamber and a reservoir mounted on said base, passages in said base for unfiltered water from the main, said passages terminating in said faucet, a cooling pipe in said reservoir and a pipe conduit in said receiving chamber which form a connecting conduit between said passages and filtering chamber, a filtered-water passage in said base which forms a conduit between said reservoir and receiving chamber, and a valve-controlled outlet for said conduit.

2. In a filter, the combination with storage, filtering and receiving chambers having openings thereinto, of a pipe-conduit through said receiving chamber, a water main, a faucet, a cooling pipe within said storage chamber, a base upon which said chambers are mounted and to which said main and faucet are attached, said base having therein passages which, respectively, connect said main with the inlet-end of said cooling pipe, connect said conduit with the outlet-end of said cooling pipe and connect said storage and receiving chambers with each other, and a valve-controlled outlet leading from the passage in said base which connects said reservoir with said receiving-chamber.

In testimony whereof I have hereunto set my hand in the presence of two subscribing witnesses.

WILLIAM R. HILDEBRAND.

Witnesses:
M. C. ALLEN,
J. W. BECKSTROM.

Copies of this patent may be obtained for five cents each, by addressing the "Commissioner of Patents, Washington, D. C."